United States Patent Office 2,923,723
Patented Feb. 2, 1960

2,923,723

2-LOWER-ALKYLCORTISONE AND 21-ESTERS THEREOF

John A. Hogg and Frank H. Lincoln, Kalamazoo Township, Kalamazoo County, Mich., assignors to The Upjohn Company, Kalamazoo, Mich., a corporation of Michigan No Drawing. Application November 16, 1955
Serial No. 547,308

4 Claims. (Cl. 260—397.45)

This invention relates to novel steroids, more particularly to 2-lower-alkylcortisone and 21-esters thereof, and a process for the production thereof. This application is a continuation-in-part of our copending application 485,318, filed January 31, 1955.

The novel 2-lower-alkylcortisone and the 21-esters thereof of the present invention may be represented by the following formula:

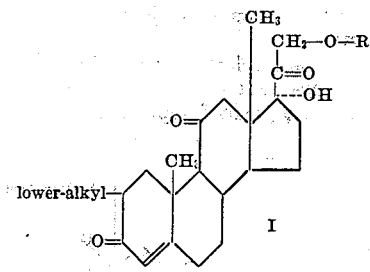

I wherein R is hydrogen or the acyl radical of an organic carboxylic acid, preferably a hydrocarbon carboxylic acid containing from one to twelve carbon atoms, inclusive, and in which the lower-alkyl radical contains up to and including eight carbon atoms.

According to the present invention, the novel 2-lower-alkyl - 17α - hydroxy - 21 - acyloxy - 4 - pregnene - 3,11,20-triones (I) of the present invention are prepared by the oxidation of a 21-ester of 2-lower-alkylhydrocortisone, i.e., a 2 - lower - alkyl - 11β,17α - dihydroxy - 21 - acyloxy - 4 - pregnene - 3,20 - dione. Hydrolysis of a 21-ester of 2-methylcortisone, for example, 2-methyl-17α-hydroxy - 21 - acetoxy - 4 - pregnene - 3,11,20 - trione with, for example, aqueous sodium bicarbonate in a nitrogen atmosphere, is productive of 2-methylcortisone, i.e., 2 - methyl - 17α,21 - dihydroxy - 4 - pregnene - 3,11,20 - trione.

2-lower-alkylcortisone and its 21-esters, e.g., 2-lower-alkylcortisone acetate, possess marked local anti-inflammatory activity. They are pituitary inhibitors of value in adrenal hyperplasia. Administration is orally or by injection for systemic hormone effect. Local anti-inflammatory activity is produced by ointments, suspension or solution.

The starting 21-esters of 2-methylhydrocortisone are prepared in the manner disclosed in our copending application S.N. 485,318, viz., 11β,21-dihydroxy-4,17(20)-[cis]-pregnadiene-3-one is reacted with dimethyl oxalate and sodium methoxide to produce the sodium enolate of 2 - methoxyoxalyl - 11β,21 - dihydroxy - 4,17(20) - [cis]-pregnadiene-3-one which is then reacted with methyl iodide to produce 2-methoxyoxyoxalyl-2-methyl-11β,21-dihydroxy-4,17(20)-[cis]-pregnadiene-3-one. Reaction of this latter compound with sodium methoxide and methanol or aqueous methanolic sodium hydroxide is productive of 2 - methyl - 11β,21 - dihydroxy - 4,17(20)-[cis]-pregnadiene-3-one which, upon acetylation with acetic anhydride in pyridine, is converted to 2-methyl-11β - hydroxy - 21 - acetoxy - 4,17(20) - [cis] - pregnadiene-3-one which, in turn, is converted by oxidative hydroxylation with osmium tetroxide and hydrogen peroxide, or osmium tetroxide and N-methylmorpholine oxide peroxide (prepared by the reaction of N-methylmorpholine with two molar equivalents of anhydrous hydrogen peroxide in tertiary butyl alcohol) to 2-methyl-11β,17α - dihydroxy - 21 - acetoxy - 4 - pregnene - 3,20 - dione (2-methylhydrocortisone acetate). Hydrolysis of this compound with aqueous sodium bicarbonate in methanol in a nitrogen atmosphere is productive of 2-methylhydrocortisone which can be reacylated with the appropriate acid anhydride, acid chloride or bromide, or acid in the presence of an esterification catalyst, to produce a 21-ester thereof, e.g., esters of acids such as specified in Example 1. Oxidation of a 21-ester of 2-methylhydrocortisone, preferably an ester of a hydrocarbon carboxylic acid containing from one to twelve carbon atoms, inclusive, is productive of the corresponding 21-ester of 2-methylcortisone.

The oxidation process of the present invention involves the reaction of a 21-organic carboxylic acid ester of 2-lower-alkylhydrocortisone, preferably a hydrocarbon carboxylic acid ester containing from one to twelve carbon atoms, inclusive, with an oxidizing agent to produce the corresponding 21-organic carboxylic acid ester of 2-lower-alkylcortisone, in which the lower-alkyl group contains up to and including eight carbon atoms, as for example methyl, ethyl, propyl, isopropyl, butyl, hexyl, octyl and the like.

Oxidizing agents which may be used include the N-haloamides and N-haloimides wherein the halogen has an atomic weight from 35 to 127, inclusive, e.g., N-bromoacetamide, N-chloroacetamide, N-bromosuccinimide, N-iodosuccinimide, bromohydantoin, etc. preferably in tertiary butyl alcohol according to techniques known in the art, with chromic acid or sodium dichromate in acetic acid, with tertiary butyl hypochloride, etc.

The following examples are illustrative of the products and process of the present invention but are not to be construed as limiting.

Example 1

2 - methyl - 17α - hydroxy - 21 - acetoxy - 4 - pregnene-3,11,20-trione

To a warm solution of 200 milligrams of 2-methyl-11β,17α - dihydroxy - 21 - acetoxy - 4 - pregnene - 3,20 - dione in ten milliliters of tertiary butyl alcohol was added, with stirring and in darkness, 0.12 milliliter of pyridine followed by 0.154 gram of N-bromoacetamide. The mixture was stirred for 24 hours at room temperature and then mixed with fifty milliliters of water containing about 1.5 grams of sodium sulfite. The tertiary butyl alcohol was removed by distillation at reduced pressure and the residue maintained at four degrees centigrade for two hours. The crystalline precipitate was filtered, air dried and then crystallized from a mixture of five milliliters of ethyl acetate and five milliliters of Skellysolve B hexane hydrocarbons to give 150 milligrams of 2-methyl-17α-hydroxy - 21 - acetoxy - 4 - pregnene - 3,11,20 - trione melting at 205 to 209 degrees centigrade, having an $[\alpha]_D$ of plus 170 degrees in acetone and the analysis below.

Calculated for $C_{24}H_{32}O_6$: C, 69.25; H, 7.75. Found: C, 68.94; H, 7.69.

Similarly, other 2-methyl - 11β,17α - dihydroxy-21-acyloxy-4-pregnene-3,20-diones are converted to other 2-methyl-17α-hydroxy-21-acyloxy - 4 - pregnene-3,11,20-triones by oxidation of the 11β-hydroxy group, e.g., with N-bromoacetamide, N-bromosuccinimide or N-chlorosuccinimide in tertiary butyl alcohol, chromic acid or sodium dichromate in acetic acid. Examples of 2-methyl-17α-hydroxy-21-acyloxy-4-pregnene-3,11,20 - triones thus prepared include those wherein the acyl group is the acyl radical of, for example, a lower-aliphatic acid, e.g., formic, propionate, butyric, isobutyric, valeric, isovaleric, trimethylacetic, 2 -2methylbutyric, 3 - ethylbutyric, hexanoic, diethylacetic, triethylacetic, heptanoic, octanoic, α-ethylisovaleric, a cyclic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3- 2,4- 2,5- 2,6- 3,4- and 3,5-dimethylbenzoic, ethylbenzoic, 2,4,6-trimethylbenzoic, 2,4,6-trimethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts), e.g., succinic, glutaric, α-methyl-glutaric, β-methylglutaric, β,β-dimethylglutaric, adipic, pimelic, suberic, a hydroxyacid, e.g., glycolic, lactic, citric, tartaric, d-maleic, d-glyceric, mannonic, gluconic, salicylic, an aminoacid, e.g., glycine, diglycollamic, triglycollamic, methylglycine, dimethylglycine, diethylglycine, para-aminosalicylic, para-aminobenzoic, other heterosubstituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl - 2- carboxylic, α-picolinic, indole-2-carboxylic, 6-hydroxyindolyl-3-acetic, N-methylmorpholyl - 2 - carboxylic, lysergic, pyrrolyl-2-carboxylic, or other acyl acid.

EXAMPLE 2

*2-ethyl-17α-hydroxy-21-acetoxy-4-pregnene-3,11,20-trione*

(A) 2-ETHYL-11β,17α-DIHYDROXY-21-ACETOXY-4-PREGNENE-3,20-DIONE

The sodium enolate of 2-methoxyoxalyl-11β,21-dihydroxy-4,17(20)-[cis]-pregnadiene-3-one, produced in accordance with S.N. 485,318, as previously described herein (i.e., by reaction of 11β,21-dihydroxy-4,17(20)-[cis]-pregnadiene-3-one with dimethyl oxalate and sodium methoxide), is reacted with ethyl bromide to produce 2 - methoxyoxalyl - 2 - ethyl - 11β,21 - dihydroxy-4-17(20)-[cis]-pregnadiene-3-one. The latter compound is reacted with sodium methoxide and methanol to produce 2 - ethyl - 11β,21-dihydroxy-4,17(20)-[cis]-pregnadiene-3-one. This is converted to the 21-acetate with acetic anhydride in pyridine and the acetate treated with osmium tetroxide and N-methylmorpholine oxide peroxide to produce 2-ethyl-11β,17α-dihydroxy-21-acetoxy-4-pregnene-3,20-dione.

(B) 2-ETHYL-17α-HYDROXY-21-ACETOXY-4-PREGNENE-3,11,20-TRIONE

Proceeding exactly as in Example 1, above, 2-ethyl-11β,17α-dihydroxy-21-acetoxy-4-pregnene - 3,20 - dione is reacted in tertiary butyl alcohol solution with N-bromoacetamide in the presence of pyridine. The product, 2-ethyl-17α-hydroxy-21-acetoxy-4-pregnene - 3,11,20 - trione (2-ethylcortisone 21-acetate), is recovered, following the procedure of Example 1.

Other 2 - lower - alkyl-11β,17α-dihydroxy-21-acetoxy-4-pregnene-3,20-diones are prepared by the procedure of A, above, substituting other alkyl halides for the ethyl bromide used therein, i.e., propyl iodide, isopropyl iodide, butyl bromide, hexyl iodide, and the like. And, following the procedure of B, above, these 2-lower-alkyl compounds are converted to the corresponding 2-lower-alkylcortisone 21-acetate.

EXAMPLE 3

*2-methyl-17α,21-dihydroxy-4-pregnene-3,11,20-trione*

A solution of 2-methyl-17α-hydroxy-21-acetoxy-4-pregnene-3,11,20-trione in methanol was freed of oxygen gas by bubbling a stream of nitrogen therethrough. A 1.0 N solution of potassium bicarbonate was similarly freed of oxygen, and one molar proportion of the former mixed with about four molar proportions of the latter at a temperature between eighteen and twenty degrees centigrade and in a nitrogen atmosphere. The mixture was stirred at room temperature for five hours, while protecting it from atmospheric oxygen with nitrogen. At the end of the period the solution was neutralized by the addition of a cold solution of glacial acetic acid and the thus-formed 2-methyl - 17α,21 - dihydroxy-4-pregnene-3,11,20-trione recovered by evaporation and crystallization.

In the same manner, saponification of the 21-esters obtained, for example, by the procedure of Example 2, produces 2-ethylcortisone and other 2-lower-alkylcortisones.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 2-lower-alkyl-17α,21-dihydroxy-4-pregnene-3,11,20-trione and 21-esters thereof represented by the following formula:

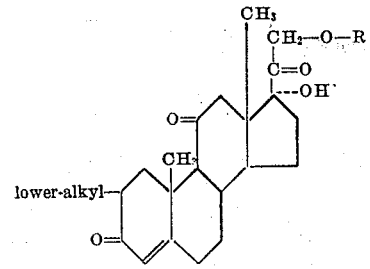

wherein R is selected from the group consisting of hydrogen and the acyl radical of a hydrocarbon carboxylic acid containing from one to twelve carbon atoms, inclusive, and the lower-alkyl radical contains from one to eight carbon atoms, inclusive.

2. 2-methyl - 17α - hydroxy - 21 - acyloxy - 4 - pregnene-3,11,20-trione wherein the acyl radical is that of a hydrocarbon carboxylic acid containing from one to twelve carbon atoms, inclusive.

3. 2-methyl - 17α - hydroxy - 21 - acetoxy - 4 - pregnene-3,11,20-trione.

4. Compound represented by the following formula:

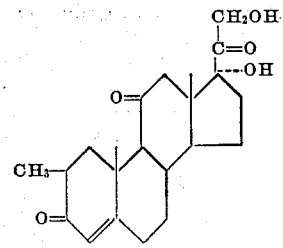

References Cited in the file of this patent
UNITED STATES PATENTS 2,751,402     Schneider _____ June 19, 1956

OTHER REFERENCES

Fieser et al.: Natural Products Related to Phenanthrene, 3rd edition, pages 407, 423 (1949).